(12) United States Patent
Zeng et al.

(10) Patent No.: US 9,047,025 B2
(45) Date of Patent: Jun. 2, 2015

(54) PRINT SERVICE PROVIDER OPERATIONS MANAGEMENT

(75) Inventors: Jun Zeng, Sunnyvale, CA (US); Eric Hoarau, San Francisco, CA (US); I-Jong Lin, Half Moon Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 13/452,813

(22) Filed: Apr. 20, 2012

(65) Prior Publication Data

US 2013/0278964 A1 Oct. 24, 2013

(51) Int. Cl.
*G06F 3/12* (2006.01)

(52) U.S. Cl.
CPC .............. *G06F 3/1207* (2013.01); *G06F 3/121* (2013.01); *G06F 3/1273* (2013.01); *G06F 3/1288* (2013.01)

(58) Field of Classification Search
None
See application file for complete search history.

(56) References Cited

U.S. PATENT DOCUMENTS

| 2006/0155520 | A1* | 7/2006 | O'Neill et al. | 703/11 |
| 2010/0171973 | A1 | 7/2010 | Kimura | |
| 2011/0273739 | A1* | 11/2011 | Grasso et al. | 358/1.15 |

OTHER PUBLICATIONS

Courbanou, D., "GreenPrint Software Assists MSPs with Managed Print Services," MSPmentor, www.mspmentor.net, May 5, 2011 (4 pgs).
"Managed Print Services," MCPc, www.mcpc.com/network-printer-performance-analytics, 2011 (1 pg).
"Lexmark Managed Print Services," www.1.lexmark.com/en_US/global-services/managed-print-services/MPS-Brochure.pdf, 2011 (8 pgs).
Fernandes, L., "Trends Shaping Next Generation Print Management," IT Analysis, www.it-analysis.com, Jan. 29, 2010, (3 pgs).

* cited by examiner

*Primary Examiner* — Saeid Ebrahimi Dehkord
*Assistant Examiner* — Lennin Rodriguezgonzale
(74) *Attorney, Agent, or Firm* — Dierker & Assoc.

(57) ABSTRACT

A system for print service provider (PSP) operations management includes a provenance analytics engine. The provenance analytics engine accesses fresh meta-data associated with fresh events in a PSP operation performed using a printing system operated by a PSP. The provenance analytics engine further accesses stored meta-data associated with past events related to past PSP operations. Still further, the provenance analytics engine accesses a component behavioral model (CBM) to produce results associated with events in a PSP operation. The provenance analytics engine analyzes the event-related meta-data.

20 Claims, 8 Drawing Sheets

| | | |
|---|---|---|
| Timestamp=05/01/2011 12:00:00 | Timestamp=05/01/2011 15:00:00 | Timestamp=05/01/2011 12:00:00 |
| Event="Job In" | Event="Press Temperature" | Event="Overheat Warning" |
| ProducedBy="Press 102" | ProducedBy="Press 102 sensor 01" | ProducedBy="Monitor" |
| AddressTo="Finisher 102" | AddressTo=All Subscribers | AddressTo=Manager, All Subscribers |
| Event Content=(Jobid=1011234, JobData=..., JobIntent=...) | Event Content=500.6 | Event Content=(Machine="Press 102". Location="Sensor 01". Action="...) |

*Fig-3*

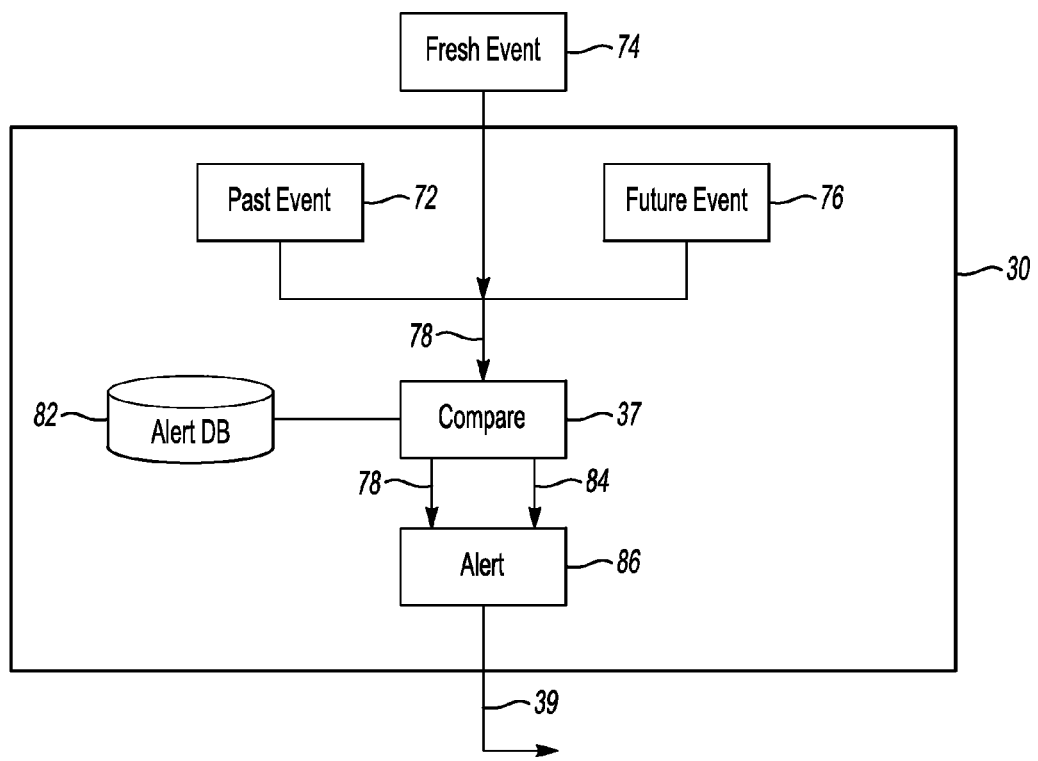

*Fig-4*

PRINT SERVICE PROVIDER OPERATIONS MANAGEMENT

BACKGROUND

Print-service-providers (PSPs) are business operations for printing. PSPs fulfill a demand for print services by printing everything from photographs and brochures, to course materials, periodicals and books. PSPs operations may be housed in a single location, or may be distributed over multiple location-dispersed production sites. PSPs may be separate business entities or may be organized into a federation of multiple PSPs.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is a table depicting examples of events according to the present disclosure;

FIG. 4 is a schematic view of an example of a process for analyzing an alert level of an event according to the present disclosure;

DETAILED DESCRIPTION

Figure 1A:
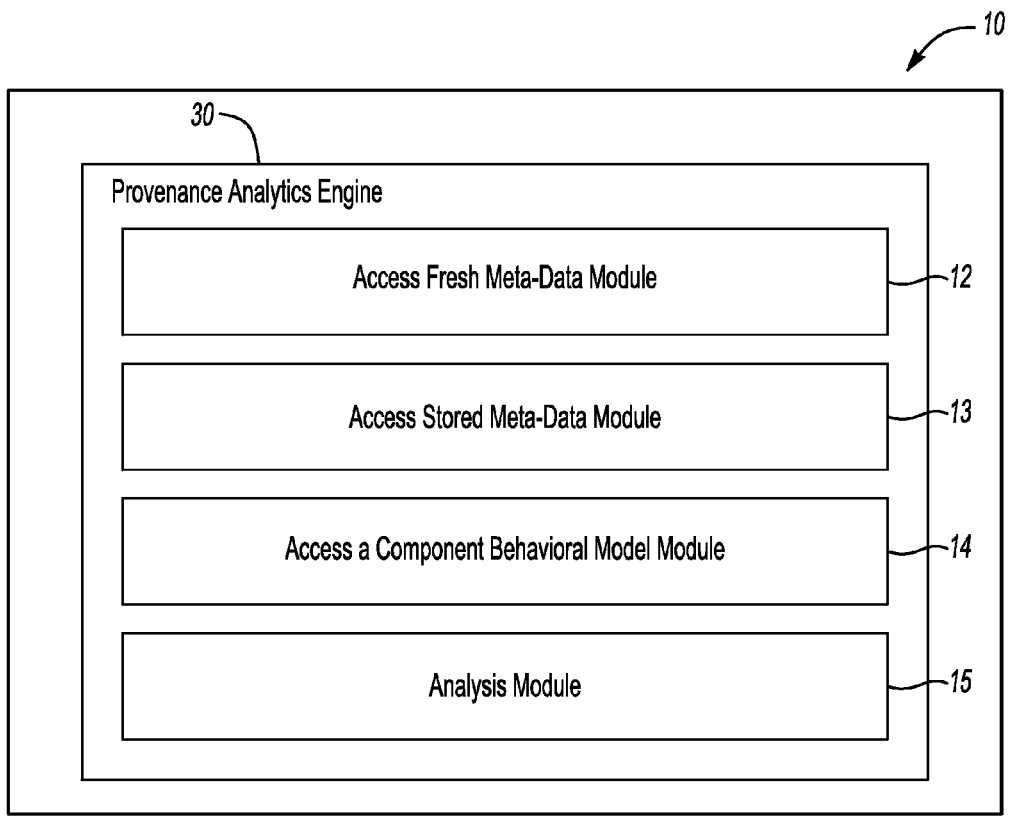
FIG. 1A is a schematic view of an example of a system for print service provider operations management as disclosed herein.

The present disclosure relates generally to print service provider (PSP) operations management. Examples of the method, computer readable medium, and system disclosed herein are used to provide provenance analytics to assist, and in some cases automate management of PSP operations.

By adopting information technology (IT) in operations management, PSPs may achieve a high level of service quality, agility, and productivity. PSP operations management may include control of data communication, storage, and processing. In some PSP operations, the data that is communicated, stored, and processed may include content data, for example, data representing print images, as well as meta-data that describe the PSP's business engagement and operations management, for example, a due date for a particular order.

Digital content data may represent digital content including, e.g., an image to be embedded in a poster to be printed. Intermediate content data is digital content data that is produced as part of a process but is not final product content. In some instances, intermediate content data can be very large. For example, image files output by a raster imaging process may be about 100 MB or larger. Storing these intermediate content data may use a relatively large amount of digital storage space. The disclosed method, computer readable medium, and system do not store intermediate content data. In some instances, however, intermediate content data may be requested for investigating a past exception event or a failure mode. A provenance analytics engine disclosed herein takes advantage of computing power from the cloud, and uses a behavioral model's device functional interface to re-produce the intermediate content data when the intermediate content data are requested. As used herein, "the cloud" means public cloud computing services, computing servers that a PSP may choose to own in-house (private cloud) or a hybrid cloud combination of both private and public cloud resources.

Digital meta-data may document a PSP's business engagement and operations management. In some instances, digital meta-data may include information that would classically be recorded using a general ledger in a paper form.

Some PSP managers rely on a paper trail for the information the managers use to manage operations. Paper forms may be used to document initiation and execution of an order; including change-steps between the initiation and execution. For example, paper documents may be used to record an estimated quote, a purchase order, initial production planning, intermediate proofing, hardcopies of proofs at different stages, and changes issued by a client. Paper may further be used to document proof versions, versions of production plans, changes made by workers, process logs, shipping instructions, shipping labels, shipping proof, and any other information associated with a job. Operations management may require review and analysis of the paper records to understand, for example, what may have led to printed material that does not meet quality objectives.

As used herein, provenance analytics is learning from historical information and relationships among pieces of the information. After reviewing a stack of information associated with a job, a manager may, for example, learn that a page was skipped in a book because 2 pages adhered to each other when original hardcopy pages provided by a customer were scanned. A manager with a good memory may recall that there were other instances of pages sticking together, and may note that the issue seems to be occurring more frequently with jobs from a particular client. As such, relationships between pieces of information (e.g. dates, quality assessments, and client names) could lead to a solution to a problem. The classical provenance analysis described above is labor-intensive, and may depend on human perseverance, experience and judgment.

Another form of PSP operations management may record information electronically on digital memory media rather than store data on a paper form. A particular type of PSP operations management system with digital data is referred to herein as an annotation-based provenance system. In an example of an annotation-based provenance system, meta-data are continuously added to the content data ("job") to document the history/lineage of content data flowing through the printing operations. The quantity of meta-data annotations attached to the content data increases and is not normally over-written or deleted. As such, a complex workflow may generate content data with a large meta-data header attached to the content data. For example, a large, complex print job, with high resolution, frequent meta-data annotation, intermediate data stored as meta-data annotation and other print production related factors may have a meta-data header larger than about a gigabit. A job with a large header may incur significant overhead for processing power, storage, and network bandwidth demand.

An example PSP associated with the disclosed method, computer readable medium, and system is an instance of a cyber-physical system. A cyber-physical system is implemented as a network of interacting elements with physical input and output rather than standalone devices. The example PSP may be at least partially characterized by a large quantity of data that documents the PSP operations. It should be understood that the value of the data may decay with time.

Referring now to FIG. 1A, an example of a system 10 disclosed herein includes a provenance analytics engine 30 including an Access Fresh Meta-Data module 12 to access fresh meta-data associated with fresh events in a PSP operation performed using a printing system operated by a PSP. The provenance analytics engine 30 further includes an Access Stored Meta-Data module 13 to access stored meta-data associated with past events related to past PSP operations. The provenance analytics engine 30 also includes an Access Component Behavioral Model module 14 to access a component behavioral model (CBM) to produce results associated with events in a PSP operation. The provenance analytics engine 30 includes an Analysis Module 15 to analyze the event-related meta-data.

Figure 1B:
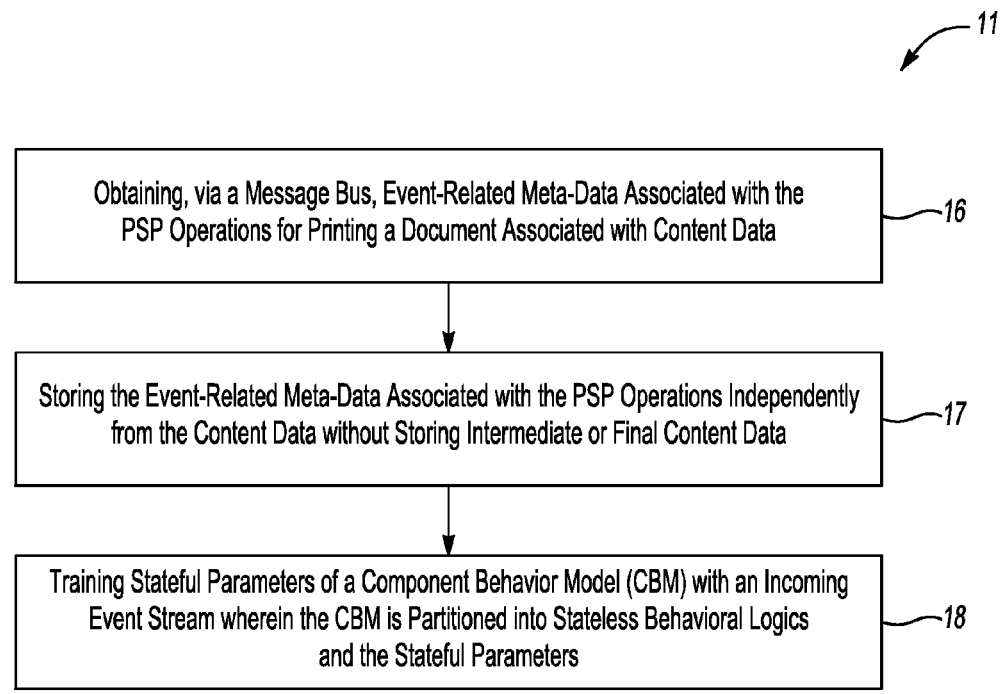
FIG. 1B is a flow diagram depicting an example of a method for PSP operations management as disclosed herein.

FIG. 1B depicts an example of a method 11 for PSP operations management as disclosed herein. As shown at reference numeral 16, the method 11 includes obtaining, via a message bus, event-related meta-data associated with the PSP operations for printing a document associated with content data. At 17, FIG. 1B depicts storing the event-related meta-data associated with the PSP operations independently from the content data without storing intermediate or final content data. As shown at reference numeral 18, the method 11 further includes training stateful parameters of a component behavior model (CBM) with an incoming event stream wherein the CBM is partitioned into stateless behavioral logics and the stateful parameters.

Figure 1C:
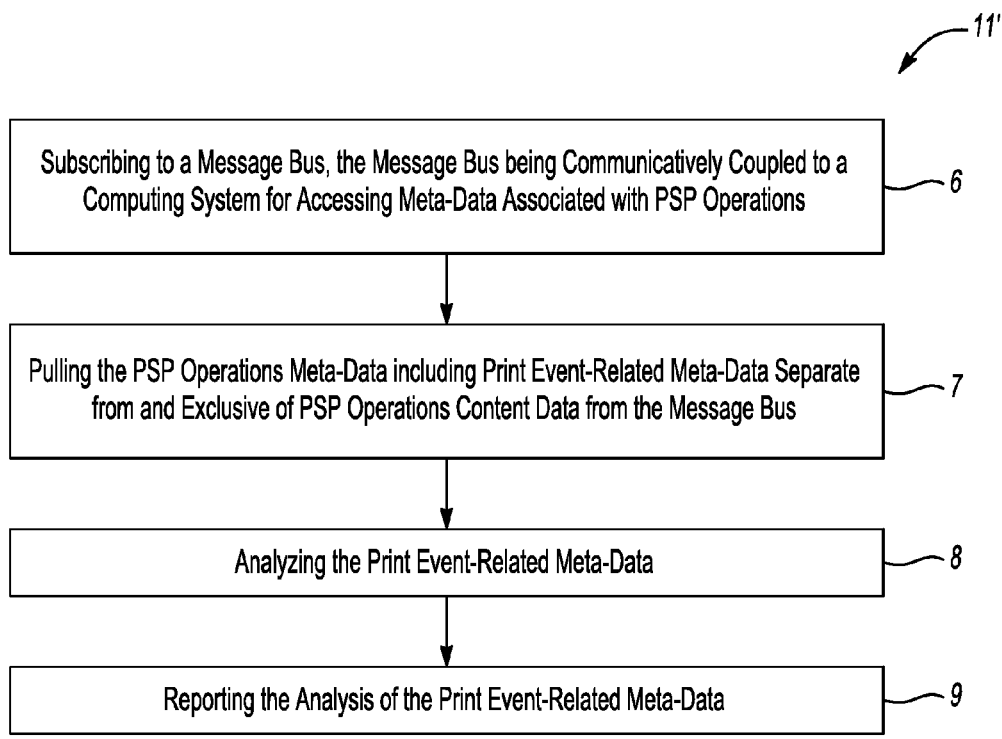
FIG. 1C is a flow diagram depicting an example of the method as disclosed herein.

FIG. 1C depicts an example of the method 11' as disclosed herein. As shown at reference numeral 6, the method 11' includes subscribing to a message bus, the message bus being communicatively coupled to a computing system for accessing meta-data associated with PSP operations. At 7, FIG. 1C depicts pulling the PSP operations meta-data including print event-related meta-data separate from and exclusive of PSP operations content data from the message bus. As shown at reference numeral 8, the method 11' further includes analyzing the print event-related meta-data. At reference numeral 9, FIG. 1C depicts reporting the analysis of the print event-related meta-data.

Figure 2:
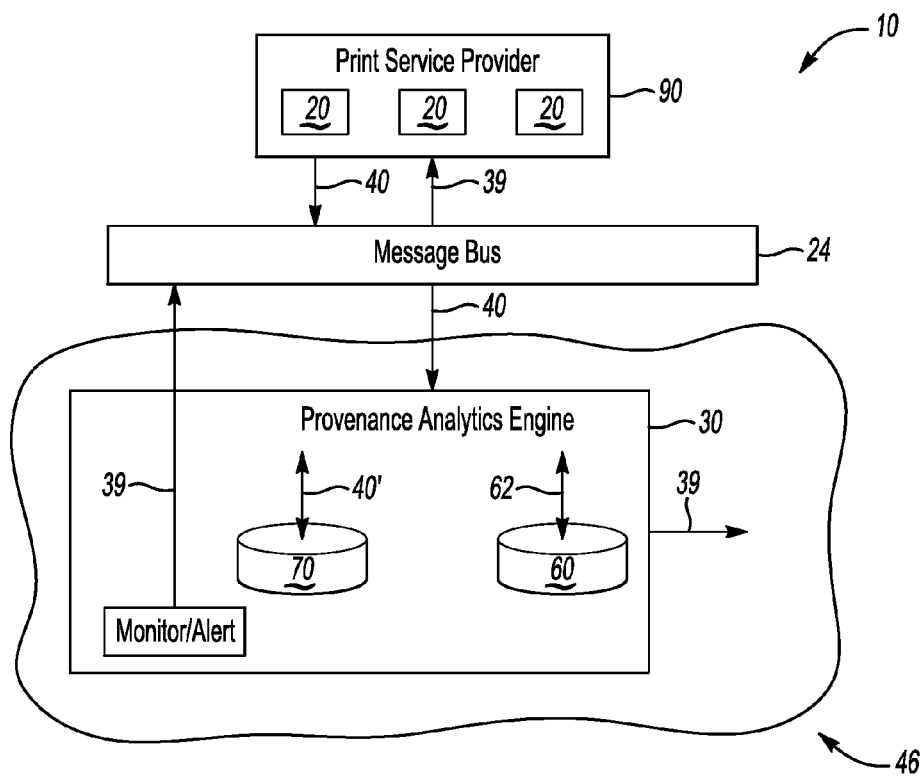
FIG. 2 is a schematic view of an example of a system for PSP operations management including a provenance analytics engine implemented in a cloud.

Referring now to FIG. 2, an example of system 10 disclosed herein includes a provenance analytics engine 30 to communicate with resources 20 within a PSP 90 to access fresh PSP operations event-related meta-data 40. The provenance analytics engine 30 further communicates with a system event log database 70 for accessing stored PSP operations event-related meta-data 40'. For example, the provenance analytics engine 30 may pull the fresh PSP operations event-related meta-data 40 from the message bus 24 then store the fresh PSP operations event-related meta-data 40 in the system event log database 70. It is to be understood that the system event log database 70 may store all of the stored event-related meta-data 40' on behalf of the provenance analytics engine 30. The provenance analytics engine 30 also communicates with a component behavioral model (CBM) library database 60 to access a CBM 62. The provenance analytics engine 30 analyzes the event-related meta-data 40, 40' to assist with, and in some cases automate, management of PSP operations.

The provenance analytics engine 30 may assist with and automate management of PSP operations, for example, by generating a process sequencing graph, performing replay and forecasting, and administering a provenance analytics service and related databases. Generally, meta-data from the provenance analytics engine 30 is shown at reference numeral 39 in FIG. 2. The provenance analytics engine 30 may produce and communicate instructions to the resources 20. The instructions may be communicated in the form of meta-data 39. For example, the provenance analytics engine 30 may include modules that provide real-time monitoring and alerting of the PSP operations, and communicate with the PSP operations in the form of meta-data 39.

From an architecture point-of-view, the resources 20 and the provenance analytics engine 30 are both producers and consumers of meta-data 39, 40. The resources 20 and the provenance analytics engine 30 publish meta-data 39, 40 to the message bus 24. The resources 20 and the provenance analytics engine 30 also receive meta-data 39, 40 that the resources 20 and the provenance analytics engine 30 subscribe to.

In an example, the provenance analytics engine 30 may compose a hierarchical process sequencing graph 41 (see FIG. 8) responsive to a user selectable granularity received from a graphical user interface 61 (see FIG. 9) wherein the hierarchical process sequencing graph 41 represents a system behavioral model (SBM) built from component behavioral models (CBMs) 62 (see FIG. 2) selected from a CBM library database 60 and organized in a hierarchical architecture.

It is to be understood that the user may select a plurality of granularities that may be individually applied to different portions of the SBM. For example, a pre-press portion of the SBM may have a low level of granularity and a finishing portion of the SBM may have a high level of granularity to expose relatively complicated activity.

It is to be further understood that the selectable granularity may be selected automatically. For example, a query may be analyzed to determine a granularity responsive to the query to produce the process sequencing graph 41 at a level of detail that is useful for assisting in PSP operations management.

Figure 10:
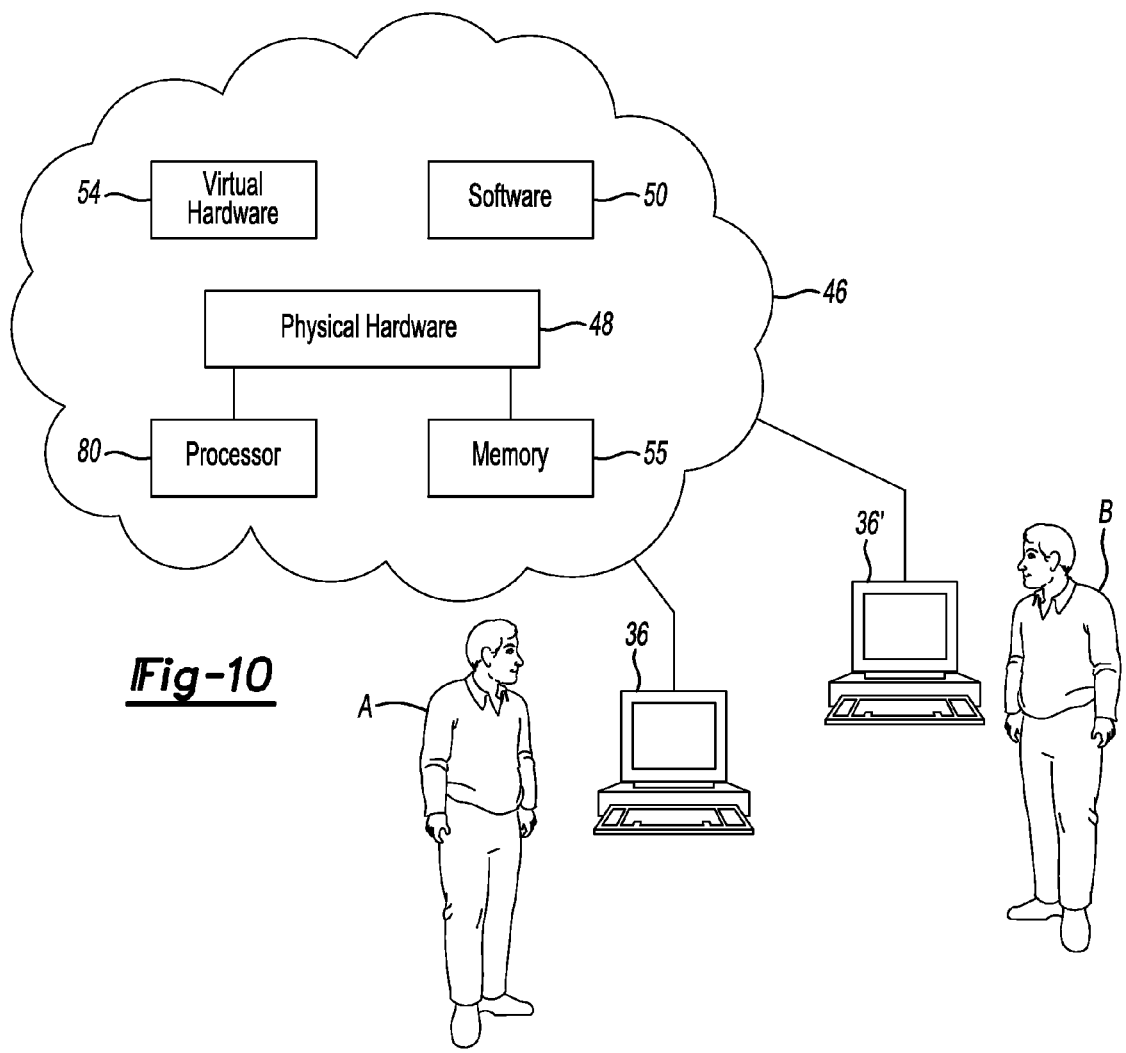
FIG. 10 depicts a semi-schematic diagram of an example of cloud architecture according to the present disclosure.

The provenance analytics engine 30 represents, generally, any combination of hardware and/or programming configured to cause execution of the communication of event-related meta-data 40, 40', and provenance analysis in a cloud computing system 46 (see FIG. 10).

Referring back to FIG. 2, as used herein, fresh PSP operations event-related meta-data 40 is substantially "live" or "real-time" event-related meta-data produced by a resource 20. For example, fresh event-related meta-data 40 may have been published by a resource 20 on, for example, a message bus 24 and an insufficient amount of time may have passed for the fresh event-related meta-data 40 to be stored in the system event log database 70. Fresh event-related meta-data 40 do not always become stored event-related meta-data 40'. For example, fresh meta-data 40 that is corrupt or duplicated may be discarded rather than stored.

In an example, the provenance analytics engine is a receiver of the fresh PSP operations event-related meta-data 40. In the example, the fresh PSP operations event-related meta-data 40 is pushed to the provenance analytics engine 30 within about 3 seconds after the fresh meta-data 40 is published. In another example, the provenance analytics engine 30 may periodically pull fresh meta-data 40 from the message bus 24 according to a selected time interval, e.g. about every minute. In the examples, fresh PSP operations event related meta-data 40 and stored PSP event-related meta-data 40' are mutually exclusive at a particular time.

As used herein, a resource 20 is an asset within the PSP 90. Some examples of resources 20 are processes, software, machines, workers, etc. that communicate with a message bus 24 through meta-data. The meta-data documents operational information about a respective resource interacting with content data. Examples of meta-data may include setting parameters, performances, descriptions, and exceptions. Resources 20 publish event-related meta-data 40 to the message bus 24 substantially simultaneously with an event occurrence.

In an example, a book cover may be cut incorrectly at a finishing station. A quality control operator may digitally photograph the incorrectly cut cover and save the digital photo as a JPEG image. The JPEG file may be submitted to the provenance analytics engine 30 as part of meta-data that documents exceptions and setting parameters. The provenance analytics engine can reproduce the cover cut error using the setting parameters stored as meta-data and verified with the JPEG image for the reproduction. Such verification may be performed by a human operator, or by an imaging analysis engine.

Referring now to FIGS. 3 and 4 together, as used herein an event 78 may be any activity by a resource 20. An event 78 may include, for example, the reception or transmission of data, setting of a parameter, replenishment of consumable supplies, powering on, clocking in, reporting a status, receiving an alert and reporting an exception. An event record 42 is a digital record that includes information relating to an event. FIG. 3 shows examples of event records 42, which will be discussed further below. Event-related meta-data 38 may be included in an event record 42. The term event-related meta-data 38, as used herein, generically includes fresh event-related meta-data 40, and stored event-related meta-data 40'. Event-related meta-data 38 may further be related to a virtual event that happens in computer simulation or a future event 76 that may be forecasted. Some examples of event-related meta-data 38 are: a time-stamp corresponding to a time of occurrence of the event; a sender and a recipient of the event; and an event category. For example, an event record 42 may include information that at 10:46:22 AM on Jul. 12, 2012, an overtemperature was reported by printer number 7.

Referring now to FIG. 4, the analysis performed by the provenance analytics engine 30 may include comparing an event 78 to an alert database 82 to determine an alert level 84 for the event 78 and causing an alert 86 to be communicated in the form of meta-data 39 in response to the alert level 84. It is to be understood that the event may be a past event 72, a fresh event 74, or a future event 76. The alert level 84 may be chosen from a plurality of alert classifications including a warning level to be issued to an operations manager, and an interruption level to bypass the operations manager and to automatically control a designated resource. For example, a printer may report an "ink supply low" event, which would be determined to be at a "warning" alert level. In the example, an alert may be sent in the form of meta-data 39 to a manager's wireless communication device informing the manager of the situation and allowing the manager to take appropriate action. Appropriate action may be, for example, to check to make sure that the ink supply is scheduled to be replenished. In another example, a printer may report a temperature in an event. In the example, the alert database 82 may have a rule that classifies the reported temperature as a "severe over-temperature" event corresponding to an "interrupt" alert level. The Compare box 37 applies the rule and determines that the reported temperature is a "severe over-temperature." A signal may be sent in the form of meta-data 39 directly to the printer to power the printer down. The manager may be informed of the interrupt level alert, but the manager is not required to intervene to shut the printer down.

The analysis performed by the provenance analytics engine 30 may further include forecasting over a selected time window. An example of a selected time window is about 15 minutes into the future. The forecasting may include simulating the PSP operations to generate a future event. Such simulation is discussed further below. The future event 76 may be compared to the alert database 82 to determine an alert level 84 for the future event 76. As described above, an alert 86 may be communicated in response to the alert level 84 determined for the future event 76.

Figure 5A:
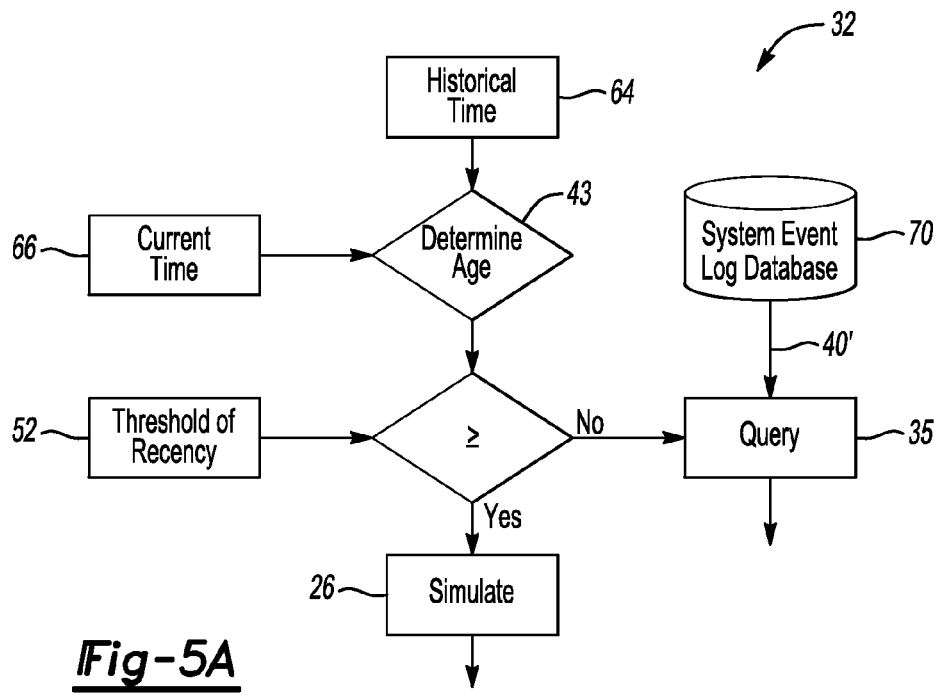
FIG. 5A is a schematic depiction of an example of a replay engine process according to the present disclosure.

Referring to FIG. 5A, the disclosed provenance analytics engine 30 may analyze past events 72 and report an analysis of past events to an operations manager. The provenance analytics engine 30 may include a replay engine 32 to reconstruct a historical PSP operations situation since intermediate and final content data is not stored. The replay engine 32 represents, generally, any combination of hardware and/or programming configured to cause execution of the reconstruction of a historical PSP operations situation. Whether the replay engine 32 uses simulation 26 or event log querying depends on an age 43 of the historical PSP operations situation. As shown at 35, the replay engine 32 will query the system event log database 70 and reproduce a PSP operations situation in existence at a predetermined historical time 64 based on stored event-related meta-data 40' when an interval between the predetermined historical time 64 and a current time 66 is less than a predetermined threshold of recency 52. If the interval between the predetermined historical time 64 and the current time 66 is greater than or equal to the predetermined threshold of recency 52, the replay engine 32 will simulate the PSP operations situation.

As used herein, a PSP operations situation means a description of a state of PSP operations at a time. A level of granularity, or detail, included in the PSP operations situation may be selected by a user via a granularity slider 59 described in more detail below. The PSP operations situation may include event-related meta-data 38, and content data, however content data is not always included. For example, a PSP operations situation may be described by a status of all of the resources 20 in a workflow as well as intermediate content data generated by the resources 20. The example PSP operations situation may include status indicators for resources like a Raster Image Processor (RIP), Press, and Finisher indicating that all sensed parameters are within their normal ranges except the Press may indicate "Yellow Ink Level Low". Image data produced by simulating the RIP may show that the particular job does not need yellow ink. It may also be possible that event-related meta-data 38 may indicate that a black and white image was selected. In such a case, it would not be necessary to include content data produced by the RIP.

It is to be understood that stored event-related meta-data 40' is deleted at an age based on the predetermined threshold of recency 52. For example, the predetermined threshold of recency 52 may be one week, thirty days, sixty days, or any age. A longer age for the predetermined threshold of recency 52 would generally require greater capacity in the system event log database 70, and may cause queries against the system event log database 70 to execute more slowly. Further, PSP operations event-related meta-data may be ephemeral. As such, a retention value corresponding to the stored event-related meta-data 40' may decay with time. It is to be understood that the predetermined threshold of recency 52 is not necessarily exactly the same as the age at which the stored event-related meta-data 40' is deleted from the system event log database 70. A buffer of some predetermined duration may be added to the predetermined threshold of recency 52 to avoid instability in operation of the replay engine 32 for events having an age near the predetermined threshold of recency 52.

Figure 5B:
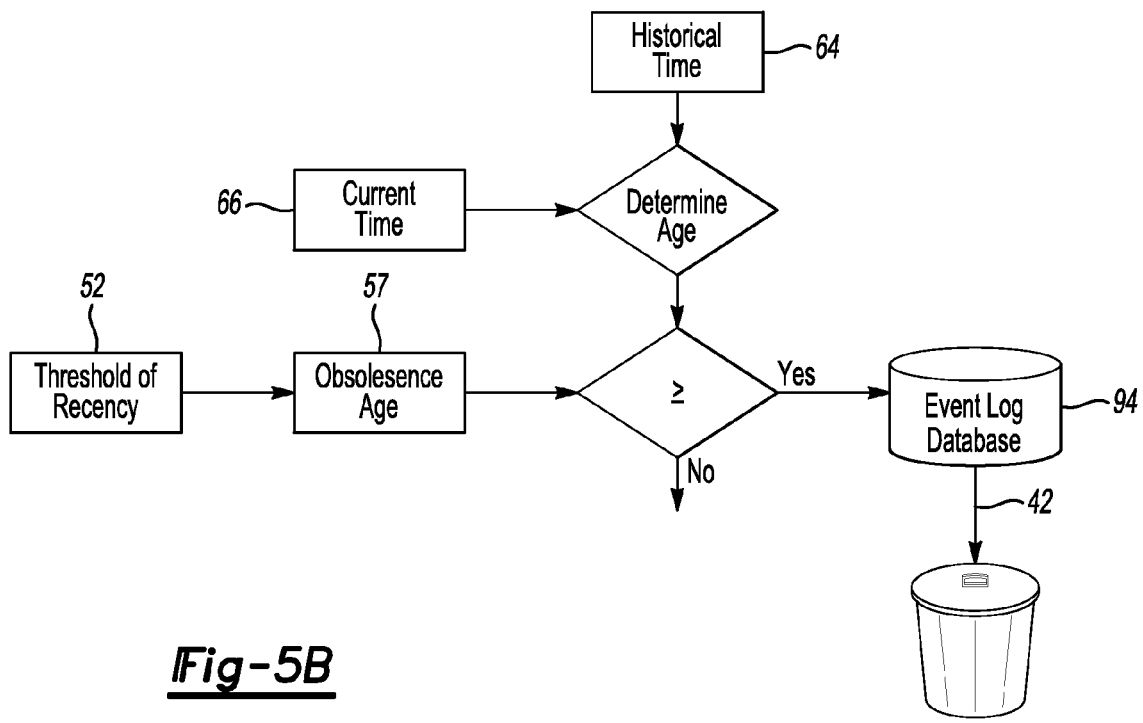
FIG. 5B is a schematic depiction of an example of a process for deleting events from an event log according to the present disclosure.

As depicted in FIG. 5B, event records 42 may be deleted from the event log database 94 at an obsolescence age 57 based on the predetermined threshold of recency 52. For example, the predetermined threshold of recency 52 may be one week, thirty days, sixty days, or any age. A longer obsolescence age 57 would generally require greater capacity in the event log database 94, and may cause queries against the event log database 94 to execute more slowly. It is to be understood that the predetermined threshold of recency 52 is not necessarily exactly the same as the obsolescence age 57 at which the event record 42 is deleted from the event log database 94. A predetermined interval may be added to the predetermined threshold of recency 52 to determine the obsolescence age 57. It is to be further understood that the predetermined threshold of recency 52 may be a function of characteristics of the event record 42. For example, an event record of a particular type of event, or an event record related to a particular type of printed product may be retained longer than other event records by having a longer predetermined threshold of recency 52.

The PSP operations situation may be communicated to an Analytics Report Generator engine 34 (see FIG. 7) for reporting to an operations manager. The Analytics Report Generator engine 34 represents, generally, any combination of hardware and/or programming configured to cause execution of the generation and communication of a report to an operations manager.

As stated above, intermediate content data is not stored in the disclosed provenance analytics engine 30. In situations where intermediate results or intermediate content data are reported, the replay engine 32 causes the intermediate content data to be reproduced rather than recalling the intermediate data from storage. The intermediate results may be reproduced through a device functional interface 28 of a CBM 62 (shown in FIG. 6).

Figure 6:
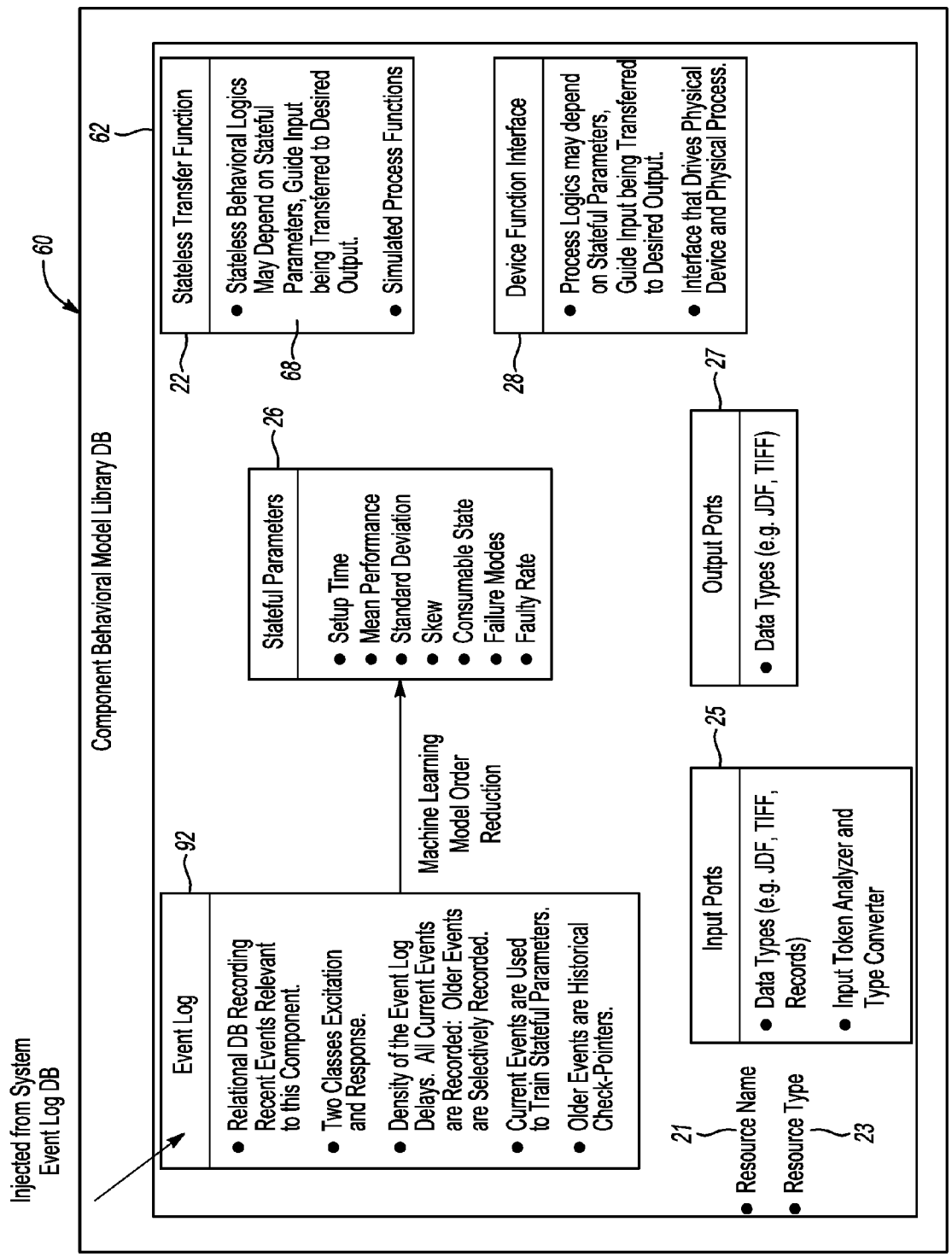
FIG. 6 is a schematic view of an example of a component behavioral model library database according to the present disclosure.

FIG. 6 depicts a schematic diagram of a CBM library database 60. The CBM 62 may be stored in the CBM library database 60. The CBM library database 60 hosts behavioral models of diverse components. Any resource 20 in the PSP operations may be a component and have a corresponding CBM 62 in the CBM library database 60. As depicted in FIG. 6, a CBM 62 may include a set of stateful parameters 26 and a stateless transfer function 22. The stateless transfer function 22 may include stateless behavioral logics 68. Together, the set of stateful parameters 26 and the stateless transfer function 22 transform a set of inputs to a set of outputs when applied by the provenance analytics engine 30. As such, the CBM 62 replicates the true physical behavior of a process performed by the resource 20. The CBM-based replication of the resource 20 may include generating intermediate content data and events. Timestamps for all events replicated by the CBM 62 match the timestamps that would be associated with the physical component under the same set of stateful parameters 26.

Still referring to FIG. 6, a CBM may include a resource name 21, a resource type 23, input ports 25, output ports 27, an event log 92, a stateless transfer function 22, stateful parameters 26, and a device functional interface 28 arranged as shown in FIG. 6.

A resource name 21 is a name of the resource 20 associated with the PSP 90. An example of a resource name 21 is "Indigo Press 02". The resource name 21 serves as a primary key for the CBM 62.

A resource type 23 corresponds to a "class" associated with the respective resource, e.g., "Indigo Press". "Indigo" is class of digital offset printing presses manufactured by Hewlett-Packard.

Input Ports 25 and Output Ports 27 define data types for inputs and outputs. It is to be understood that the disclosed provenance analytics engine 30 may serve a loosely coupled, distributed system. The input ports 25 are not strongly typed in the disclosed CBM. A type converter may be embedded in each input port 25 to allow input information to be converted or extracted from the input data type thereby avoiding data-type mismatch errors. For example, a Raster Imaging Process (RIP) CBM may require a PDF document as input to carry out a transformation. An input port of the RIP CBM may allow any form of input as long as the input contains the PDF document or a pointer to retrieve the PDF document. For example, an XML document may include the PDF document as an element. After receiving the XML document through the RIP CBM input port, the RIP CBM may automatically extract the PDF document and carry out the transformation. The event log 92 shown in FIG. 6 is an event log database 94 that records all events 78 that are relevant to a respective resource 20. FIG. 3 depicts three examples of event records 42 that may be stored in an event log 92. Referring back to FIG. 6, each event record 42 in the event log 78 includes at least a timestamp 31, sender/recipient name 33, event category 79 and event content 77. Some examples of events include: input content data arrival; setting parameters; output content data departure; control/sensing meta-data from or to the resource 20; and alert message from the Provenance Analytics Engine 30 about this resource 20.

Referring back to FIG. 6, in the present disclosure, a dynamic behavior of the resource 20 may be described by a stateless transfer function 22 together with stateful parameters 26. The stateless transfer function 22 describes an intrinsic process logic of the resource 20. Stateful parameters 26 describe information that is specific to the resource 20, and/or local settings, and/or external excitation. Stateful parameters 26 are resource-specific and may vary from time to time when conditions change. As such, stateful parameters 26 define a particular state for the resource 20. For example, an electric motor may require more electrical power to generate a certain amount of torque as a number of operating hours for the motor increases. The torque output of the electric motor may further depend on an armature temperature. Stateful parameters 26 for the electric motor in the example may include a number of hours of operation and an armature temperature. Stateful parameters 26 may be corrected in the event log 92 through model order reduction techniques and machine learning techniques. As such the dynamic behavior of the resource 20 will match with the events 78 recorded in the event log database 94.

The device functional interface 28 routes input content data to the physical resource 20, drives the resource 20 to produce all intermediate and final results, and retrieves the intermediate and final results back to the CBM 62. It is to be understood that the device functional interface 28 does not route input content data to the model of the resource 20. The device functional interface 28 may be used when the intermediate results (content data) may aid in a causality investigation.

Figure 7:
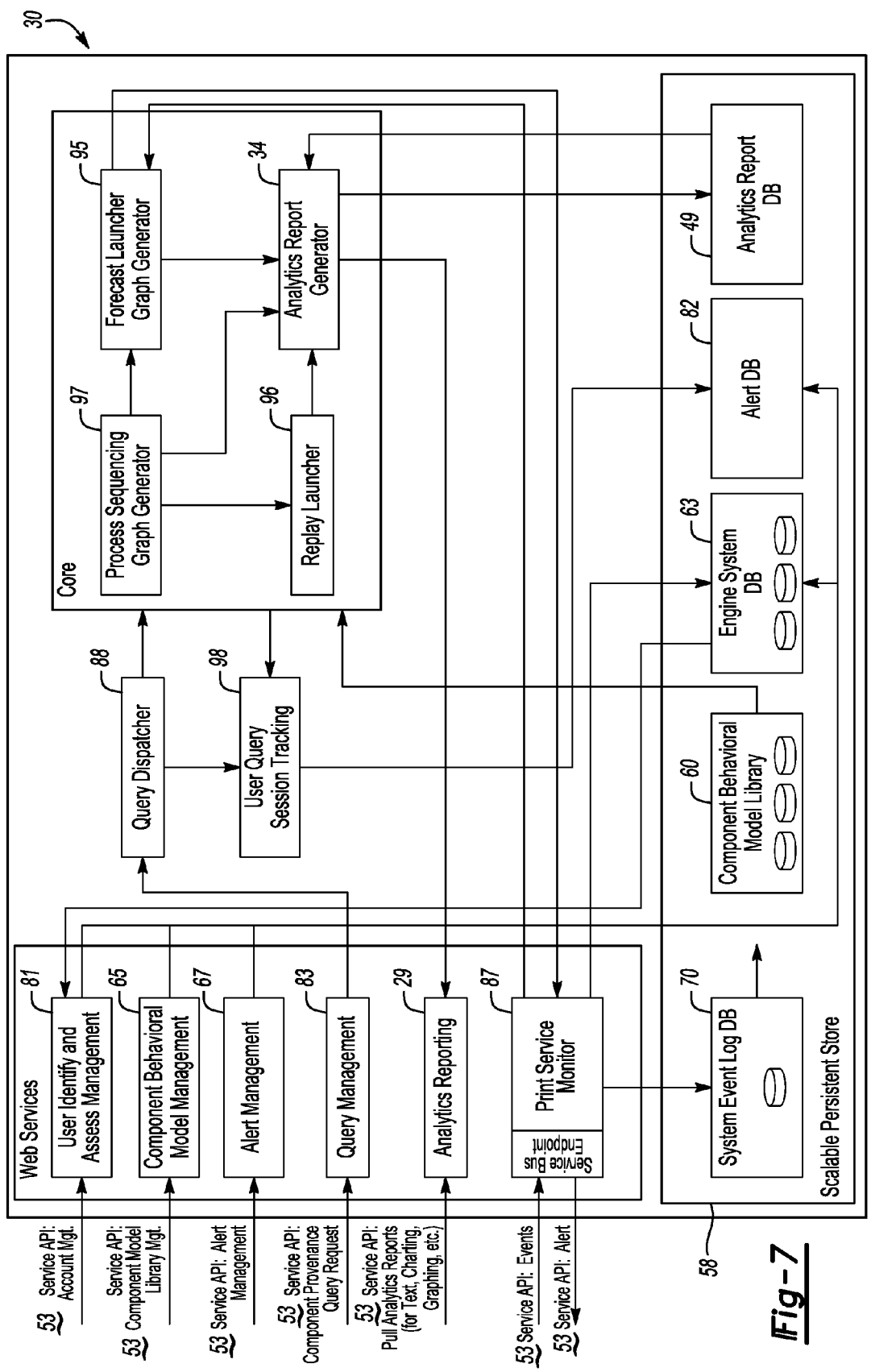
FIG. 7 is an architecture diagram of an example of a provenance analytics engine according to the present disclosure.

As depicted in FIG. 7, a provenance analytics service may be implemented as a cloud service using the provenance analytics engine 30 as the service back-end. As stated previously herein, the cloud deployment may be a public cloud, a private cloud, or a hybrid cloud. A portion of the provenance analytics engine 30 may be deployed in a public cloud, and another portion may be deployed in a private cloud. Examples of a cloud platform may be Eucalyptus (an open-source cloud platform), Open Stack (an open-source cloud platform), and Amazon Web Service (AWS). AWS is an example of a public cloud platform.

The provenance analytics engine 30 may run on the cloud to provide the provenance analytics service. FIG. 7 shows an example of an architecture for the provenance analytics engine 30 implemented on a cloud. A User Identity & Assess Management engine is depicted at reference numeral 81. To support a multi-tenant environment, the provenance analytics engine 30 performs identity management to authenticate users and restrict data access on digital assets. The digital assets may include the system event log database 70. Another digital asset may be the CBM Library database 60. Each print factory uploads CBMs that characterize resources 20 on the respective print factory floor. It is to be understood that the CBM library database 60 may be preloaded with CBMs that may be useable without modification to represent the resources 20 on the respective print factory floor. It is to be further understood that the CBMs may be modified to represent the resources 20 on the respective factory floor. An engine system database 63 is another example of a digital asset with access controlled by User Identity & Assess Management 81. The engine system database 63 may contain, for example, user account information and a history of provenance queries that an operations manager of each print factory has submitted. The User Identity & Assess Management engine 81 evaluates the ownership of the user to the digital assets based on user credentials stored in the Engine System database 63. Examples of user credentials are: Amazon S3's access key and Amazon EC2's user pub/private key pair.

Component Behavioral Model Management engine 65 allows a user to set up CBMs for resources 20 on a respective factory floor. The CBMs are stored in the CBM library database residing in a persistent store 58 of the cloud. Examples of a persistent store 58 in a cloud are S3 in AWS, and Walrus in Eucalyptus. The CBMs may be assigned ownership and access rights. By default only the owner can browse, retrieve, update and delete the CBMs. The owner may, however, grant other users different levels of rights to access the respective CBMs.

The alert management engine 67 allows users to set up rules for responding to alerts in an automated monitoring service. A Query Management engine is shown in FIG. 7 at reference numeral 83. An operations manager (a user of the provenance analytics service) may log in to the system 10 and submit a provenance query. Some examples of the provenance query are: Find a process sequencing graph 41 (see FIG. 8) that produced this particular content data; investigate a root-cause of an alert signal issued by the Provenance Analytics Engine 30; reproduce a history with all intermediate results to guide the root-cause investigation; and forecast effects of a proposed change on downstream production. The Query Management engine 83 admits and validates the provenance query, saves the provenance query as a pending query in the Engine System database 63 residing in the persistent store 58, and then passes the provenance query to a Query Dispatcher engine 88.

An Analytics Reporting engine 29 manages analytics reports (charts, graphs and text reports) produced by virtual machines (VMs) launched within Analytics Report Generator engine 34. The Analytics Reporting engine 29 is capable of operating in a push mode and a pull mode. In the push mode, reports may be pushed out as they are ready. The reports may be stored in an Analytics Report Database 49 residing in the Scalable Persistent Store 47 to wait for a retrieval request (pull). The Analytics Report Generator engine 34 may pull a previously generated report from the Analytics Report Database 49 and send the report to the Analytics Reporting engine 29.

The Query Dispatcher engine 88 issues parallel requests to execute queries in a short time. For each query, the Query Dispatcher engine 88 may issue parallel requests to, e.g. a forecast launcher engine 95, a replay launcher engine 96, a Process Sequencing Graph Generator engine 97, and/or the Analytics Report Generator engine 34, to launch corresponding VMs to execute the query in a near real-time manner. For example, a replay query request may trigger three parallel requests to: the Process Sequencing Graph Generator engine 97, the Replay launcher engine 96 and the Analytics Report Generator engine 34. Each engine will launch one VM using a specific image containing built-in software that delivers the VM functions. For example, a VM launched within the Process Sequencing Graph Generator 97 may contain software that queries the Event Log database 94 built inside the Component Behavioral Model Library database 60 and produces a process sequencing graph 41 (see FIG. 8). The VM launched within the Process Sequencing Graph Generator 97 may provide a process sequencing graph 41 to a VM within Replay launcher engine 96. In turn, a VM in Replay launcher engine 96 may provide results from the Replay engine 96 to the Analytics Report Generator engine 34. In the example, the Analytics Report Generator engine 34 may use the results from the Replay engine 96 to produce provenance analytics reports specified by the provenance query.

The User Query Session Tracking engine 98 tracks VMs employed by a query, and monitor an operational status of each VM. For example, Ganglia, an open-source VM monitoring code, may be used to monitor the operational status of each VM. Data related to the operational status of the VMs may be saved in the Engine system database 63.

Figure 8:
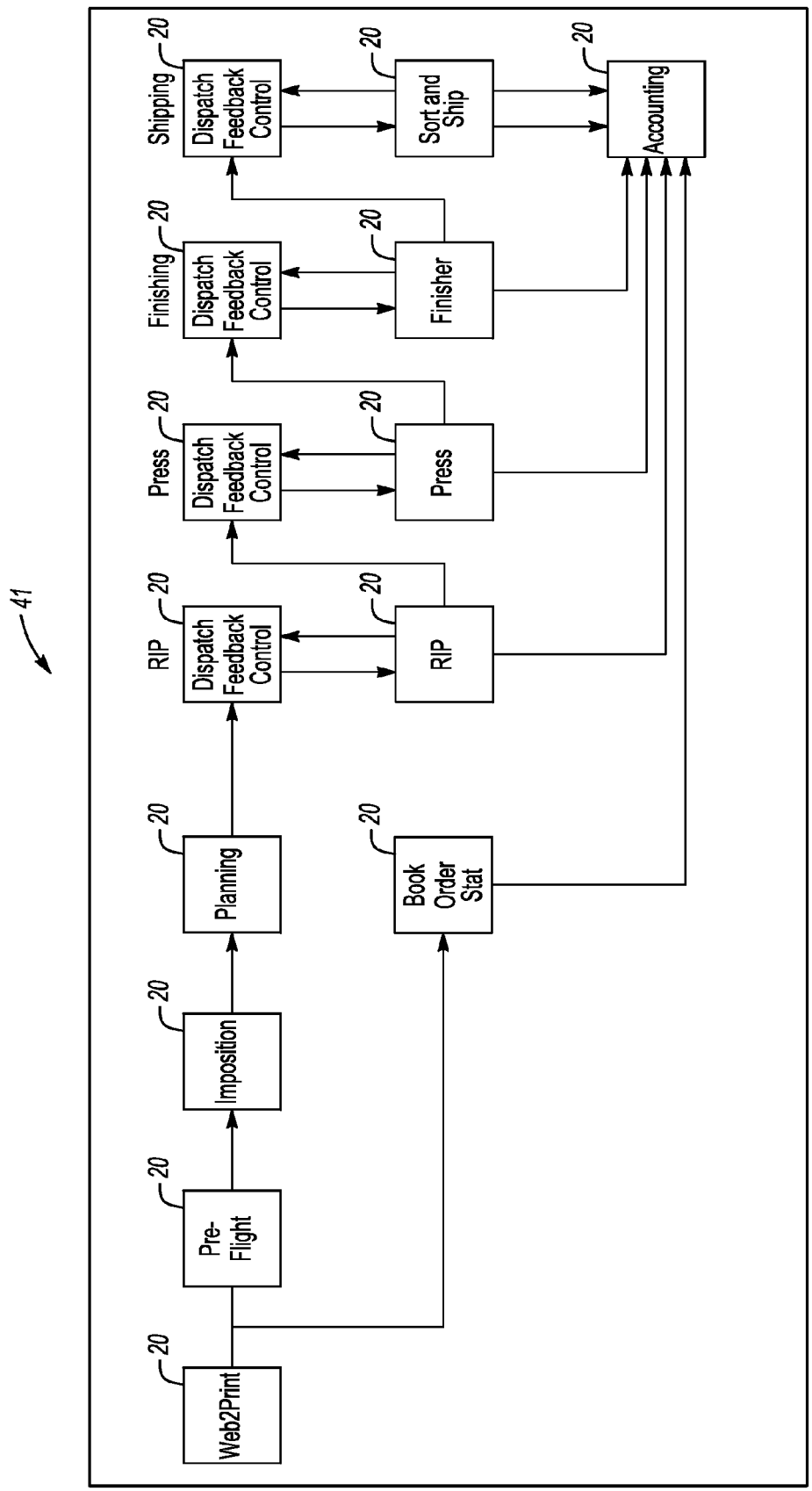
FIG. 8 depicts an example of a process sequencing graph according to the present disclosure.

The Process Sequencing Graph Generator 97 queries the Event Log database in the CBM library database 60, and creates a process sequencing graph 41 (see FIG. 8) related to given content data. FIG. 8 depicts an example of a process sequencing graph 41. FIG. 8 is a direct graph with nodes as resources 20 and arrows indicating a direction of the content data flow. An example of operation of the Process Sequencing Graph Generator 97 follows. Beginning with content data, for example an image that is printed in a catalog, the Process Sequencing Graph Generator queries the last resource 20 that produced the content data. Timestamps in the event-related meta-data may be used to correlate the content data with the resource that produced the content data. Further querying about the correlated resource will identify the input content data that the output content data is derived from. Inputs and outputs at each step of a workflow may be traced by iteratively following the same query procedure from resource 20 to resource 20 backward through the workflow. A process sequencing graph 41 may be produced using the results of the iterative query procedure.

Figure 9:
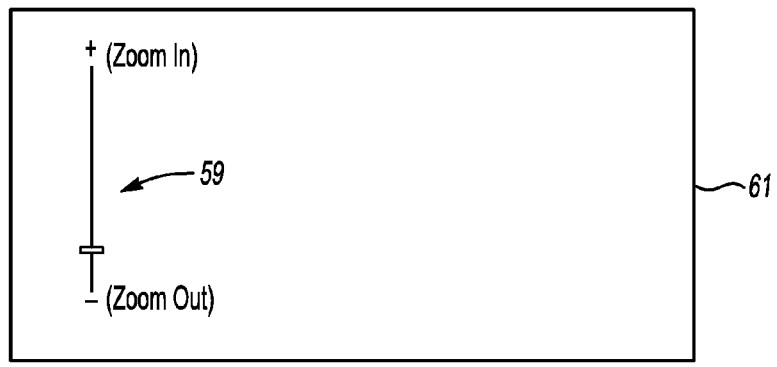
FIG. 9 depicts a semi-schematic diagram of an example of a granularity slider according to the present disclosure.

The Process Sequencing Graph Generator 97 may include a Granularity Slider 59 operatively displayed on a Graphical User Interface 61 as depicted in FIG. 9. A user may select a level of granularity for a provenance investigation or process sequencing graph 41 (see FIG. 8). A more detailed view may use more computing time and storage. With a higher granularity selection ("zoom-in") the user can study the details of the PSP operations. With a lower granularity selection ("zoom-out") the user can study a much larger production workflow without consuming a high amount of computing and storage resources. It is to be understood that more than one granularity slider 59 may be used to indicate a plurality of granularities that may be individually applied to different portions of the SBM in the process sequencing graph 41 (see FIG. 8). It is to be further understood that the selection of the granularity may be automated. For example, granularity may be automatically selected at predetermined level in response to a provenance query according to a predetermined rule.

The Forecast Launcher engine 95 launches VMs to pull a process sequencing graph 41 (see FIG. 8) from a related VM launched by the Process Sequencing Graph Generator 97. The forecast launcher further retrieves the Stateful Parameters 26 and stateless transfer function 22 from relevant resources 20, and runs simulations to produce a future operation situation. The future operation situation will be served to the VMs launched by the Analytics Report Generator engine 34.

The Replay Launcher engine 96 launches VMs to pull a process sequencing graph 41 (see FIG. 8) from a related VM launched by the Process Sequencing Graph Generator 97. A query may relate to a predetermined historical time. If an interval between the predetermined historical time and a current time is less than a predetermined threshold of recency 52 (see FIG. 5A) the Replay Launcher will cause a VM to query the Event Log database 94 in the CBM library database 60 of resources 20 involved in the process sequencing graph 41 (see FIG. 8). A process history may be regenerated based on the stored event-related meta-data 40'. If the interval between the predetermined historical time and the current time is greater than or equal to the predetermined threshold of recency 52, a "recent" portion of the history will be generated via the Event Log database 94 as described above; the portion older than the threshold of recency 52 will be reproduced via simulation. It is to be understood that if the query requests intermediate (content data) results, the Device Functional Interface 28 in the CBM of relevant resources 20 will be deployed to produce the intermediate results. The reproduced or simulated PSP operations situation will be served to the VMs launched by the Analytics Report Generator engine 34.

The Analytics Report Generator engine 34 may receive results from VMs launched within Forecast Launcher engine 95, Replay Launcher engine 96, and Process Sequencing Graph Generator engine 97 to produce provenance analytics charts, graphs and reports specified by the provenance query.

The Print Service Monitor engine 87 subscribes all events published to the message bus 24. Once an event 78 is received, the Print Service Monitor engine 87 sends the event 78 to System Event Log database 70 for storage. Upon receiving a fresh event 44, the Print Service Monitor engine 87 will use a core function of Forecast Launcher engine 95 to launch a VM to run a Forecast function with a selected time window into the future (e.g., 15 minutes) to generate a future event 76. The future event 76 is compared with the Alert database 82 to determine if an alert message 86 should be issued. Alerts may be at different levels. An example of a lower level alert may be a "warning" level. A high level alert may be an "Interruption" which may automatically control a resource 20.

The System Event Log database 70 stores events until the events reach a predetermined age. Events that are older than the predetermined age are deleted from the System Event Log database 70. It is to be understood that the predetermined age for deletion of an event from the System Event Log database 70 may be greater than a similar age for deletion from the Event Log database 94 in the CBM Library database 60. Further, the predetermined age for deletion may be a function of characteristics of the event record 42. For example, an event record of a particular type of event, or an event record related to a particular type of printed product may be retained longer than other event records by having a longer predetermined age for deletion.

It is to be further understood that certain data in the System Event Log database 70 may be statistically summarized. Such aggregation data may be used in summarizing the PSP operations situation with low granularity (in a "zoomed-out" view). The statistically summarized data may be retained after the certain data have been deleted. Some examples of summarizable data are resource utilization, risk level, and print job type. In some instances, the statistical summaries of the data may be used along with simulation to reproduce a past event.

Once an event 78 is admitted in System Event Log database 70, the System Event Log database 70 will push the event 78 to the Event Log database 94 in the CBM of all relevant resources 20. For example, the event 78 will be pushed to the event log database 94 in a CBM 62 for a sender, a recipient and an other resource 20 having operations and a CBM 62 may use information contained in the event 78.

Upon receiving an event 78 in the Event Log database 94, the CBM 62 may trigger machine learning or a dimensional reduction technique to use the event 78 to fine tune the Stateful Parameters 26.

The Alert database 82 includes rules for determining an alert level 84 corresponding to an event 78. As stated above, users may update the alert database 82 through the Alert Management engine 67. In addition, users may select an option to automatically add events 78 that are determined to be highly correlated with existing alerts 86 to the Alert database 82. If such an option is selected, the Print Service Monitor engine 87 will automate the determining if the events 78 are highly correlated and the updating of the alert database 82.

FIG. 7 depicts service Application Programming Interfaces (APIs) 53 interfacing with engines performing web services 51 of the Provenance Analytics Engine 30. In an example, an API 53 may apply a Representational State Transfer (REST) architectural style that provides guidance on the architecture of web services. RESTful service APIs can be implemented using Jersey. The RESTful service APIs may serve up to clients with JavaScript Object Notation (JSON) data that can be easily digested by Asynchronous JavaScript and XML (AJAX) clients. APIs 53 other than RESTful APIs are also disclosed herein.

Referring now to FIG. 10, as used herein, the cloud computing system 46 refers to a computing system including multiple pieces of hardware operatively coupled over a network so that they can perform a specific computing task. The cloud 46 may include a combination of physical hardware 48, software 50, and/or virtual hardware 54. The cloud computing system 46 is configured to (i) receive requests from the computing systems 36, 36' (or from users A and/or B using computing systems 36, 36'), and (ii) return request responses. As examples, the cloud computing system 46 may be a private cloud, a public cloud or a hybrid cloud. Further, the cloud 46 may be a combination cloud computing system including a private cloud (or multiple private clouds) and a public cloud (or multiple public clouds).

The physical hardware 48 may include, among others, processors, memory devices, and networking equipment. The virtual hardware 54 is a type of software 50 that is processed by the physical hardware 48 and designed to emulate specific hardware. As an example, virtual hardware 54 may include a virtual machine (VM), i.e., a software implementation of a computer that supports execution of an application like a physical machine. An application, as used herein, refers to a set of specific instructions executable by a computing system for facilitating carrying out a specific task. For example, an application may take the form of a web-based tool providing users A, B with a specific functionality, e.g., provenance analytics. It will be understood that an application as used herein is not limited to a provenance analytics application but refers to an application supporting performing a specific task using computing resources such as, among others, enterprise applications, accounting applications, multimedia related applications, or data storage applications. Software 50 is a set of instructions and data configured to cause virtual hardware 54 to execute an application. As such, the cloud computing system 46 can render a particular application available to users A, B.

Executing an application in the cloud 46 may involve receiving a number of requests (e.g., request to perform a component provenance query), processing the requests according to the particular functionality implemented by the application (e.g., performing the component provenance query), and returning request responses (e.g., transmitting the provenance analytics report to the requesting computing system 36 or 36'). For executing the application, the resources (e.g., physical hardware 48, virtual hardware 54, and software 50) of the cloud computing system 46 may be scaled depending on the demands posed on the application. For example, cloud 46 may vary the size of the resources allocated to the application depending on the number of requests, the number of users or sub-systems interacting with the application, or requirement on the performance of the application (e.g., a maximum response time). While not shown, it is to be understood that the cloud 46 may also include an interface that allows the computing systems 36, 36' to communicate with the components of the cloud 46.

As shown in FIG. 10, the computing systems 36, 36' may include a computer screen interfacing with a user A, B via, for example, a GUI 61 displayed within a web browser. Examples of web browsers are Microsoft Internet Explorer, Firefox, Google Chrome, and Opera. The computing systems 36, 36' may be VMs that interface with the cloud via the API 53 in an automated fashion through software programming.

In the example of FIG. 10, the physical hardware 48 of the cloud computing system 46 may include a processor 80 and a memory 55. The processor 80 may be any processor that is capable of executing program instructions stored in the memory 55 to perform, for example, provenance analytics. The memory 55 may include an operating system and applications, such as a query management application and a report generating application. The operating system may be a collection of programs that, when executed by the processor 80, serve as a platform on which the query management application and the report generating application can run. Examples of operating systems include, for example, various versions of Linux® and Microsoft's Windows®.

It is to be understood that the memory 55 may be integrated in the same device as the processor 80, or it may be separate from, but accessible to the respective computing system 36, 36' and processor 80.

The query management application represents program instructions that, when executed by the processor 57, function as a service that causes i) admission and validation of the provenance query, ii) saving of the provenance query as a pending query in the Engine System database 63 residing in the persistent store 58, and iii) passing of the provenance query to a Query Dispatcher engine 88. The report generating application represents program instructions that, when executed by the processor 57, function as a service that causes i) receiving of results from VMs launched within Forecast Launcher engine 95, and/or Replay Launcher engine 96, and/or Processing Sequencing Graph Generator engine 97, and ii) produce provenance analytics charts, graphs and reports specified by the provenance query.

In the cloud computing system 46 of FIG. 10, the Provenance Analytics Engine 30 of FIG. 7 may have the hardware portions implemented as the processor 80 and may have the programming portions implemented as the operating system and applications. In this example then, each of the computing systems 36, 36' may utilize the services of the cloud to perform provenance analytics and to provide reports to the users.

Each of the users A, B may be a human being, or a computer program. For example, users A, B may be a business intelligence software program that may request a provenance analytics report through a RESTful API.

The figures set forth herein aid in depicting various architectures, functionalities, and operations of the examples disclosed herein. Throughout the description, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems 36, 36'), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems 36, 36'. Computer readable media may include any one of many physical media such as, for example, electronic, magnetic, optical, electromagnetic, or semiconductor media. More specific examples of suitable computer-readable media include a portable magnetic computer diskette such as floppy diskettes or hard drives, a random access memory (RAM), a read-only memory (ROM), an erasable programmable read-only memory, or a portable CD, DVD, or flash drive.

While several examples have been described in detail, it will be apparent to those skilled in the art that the disclosed examples may be modified. Therefore, the foregoing description is to be considered non-limiting.

What is claimed is:

1. A system for print service provider (PSP) operations management, comprising a provenance analytics engine to:
    access fresh meta-data associated with fresh events in a PSP operation performed using a printing system operated by a PSP;
    access stored meta-data associated with past events related to past PSP operations;

access a component behavioral model (CBM) to produce results associated with events in a PSP operation; and
analyze the event-related meta-data;
wherein the CBM includes:
a resource name for a primary key, the resource name designating a respective resource operatively associated with the PSP operations;
a resource type corresponding to a class associated with the respective resource;
a CBM event log database to record an event record of an event that is relevant to the respective resource;
stateless behavioral logics to define intrinsic processes of the respective resource; and
stateful parameters trained automatically by incoming event streams.

2. The system as defined in claim 1 wherein the CBM further includes:
input ports, each input port including a type converter to convert or extract input information from input data input to the CBM.

3. The system as defined in claim 1, wherein there is a plurality of the component behavioral models (CBMs), and wherein the provenance analytics engine is further to:
compose a hierarchical process sequencing graph responsive to a selectable granularity, wherein the hierarchical process sequencing graph represents a system behavioral model (SBM) built from the plurality of component behavioral models (CBMs), the plurality being selected from a CBM library database and organized in a hierarchical architecture.

4. The system as defined in claim 1 wherein analyzing the event-related meta-data further includes:
comparing the fresh event, the past event, or a future event to an alert database to determine an alert level for the event; and
causing an alert to be communicated in response to the alert level.

5. The system as defined in claim 1 wherein analyzing the event-related meta-data further includes forecasting a future event over a selected time window, the forecasting including simulating future PSP operations to generate the future event.

6. The system as defined in claim 1 wherein the events are selected from the group consisting of the reception or transmission of data, setting of a parameter, replenishment of consumable supplies, powering on, clocking in, reporting a status, receiving an alert, reporting an exception, and combinations thereof.

7. The system as defined in claim 1 wherein the provenance analytics engine is further to:
analyze past events using the CBM; and
report the analysis of past events to an operations manager.

8. The system as defined in claim 7, further comprising a replay engine to:
reproduce a PSP operations situation at a predetermined historical time based on stored event-related meta-data when an interval between a predetermined historical time and a current time is less than a predetermined threshold of recency;
simulate the PSP operations situation when the interval between the predetermined historical time and the current time is greater than or equal to the predetermined threshold of recency; and
communicate the PSP operations situation to a report engine for reporting to an operations manager.

9. A tangible machine readable storage medium storing instructions that when executed by a processor implements a method, the method comprising:
subscribing to a message bus, the message bus being communicatively coupled to a computing system for accessing meta-data associated with PSP operations;
pulling the PSP operations meta-data including print event-related meta-data separate from and exclusive of PSP operations content data from the message bus;
analyzing the print event-related meta-data using a component behavioral model (CBM); and
reporting the analysis of the print event-related meta-data;
wherein the CBM includes:
a resource name for a primary key, the resource name designating a respective resource operatively associated with the PSP operations;
a resource type corresponding to a class associated with the respective resource;
a CBM event log database to record an event record of an event that is relevant to the respective resource;
stateless behavioral logics to define intrinsic processes of the respective resource; and
stateful parameters trained automatically by incoming event streams.

10. The medium as defined in claim 9 wherein the CBM further includes:
input ports, each input port including a type converter to convert or extract input information from input data input to the CBM.

11. The medium as defined in claim 9, the method further comprising:
analyzing past events using the component behavior model (CBM); and
reporting the analysis of past events to an operations manager 12. The medium as defined in claim 9 wherein. analyzing the print event-related meta-data includes:
comparing a selected PSP operations event to an alert database to determine an alert level for the selected event; and
causing an alert to be communicated in response to the alert level.

13. The medium as defined in claim 12 wherein analyzing the print event-related meta-data further includes:
a forecasting function having a selected time, the forecasting function to simulate future PSP operations to generate a future event.

14. The medium as defined in claim 9, the method further comprising:
reproducing a PSP operations situation at a predetermined historical time based on stored event-related meta-data when an interval between the predetermined historical time and a current time is less than a predetermined threshold of recency;
simulating the PSP operations situation when the interval between the predetermined historical time and the current time is greater than or equal to the predetermined threshold of recency; and
communicating the PSP operations situation to a report engine for reporting to an operations manager.

15. The medium as defined in claim 14 wherein simulating the PSP operations situation includes applying a statistical summary of deleted event-related meta-data, the component behavioral model (CBM), or combinations thereof.

16. A method for print service provider (PSP) operations management, the method comprising:
obtaining, via a message bus, event-related meta-data associated with the PSP operations for printing a document associated with content data;

storing, in a non-transitory, tangible computer-readable medium, the event-related meta-data associated with the PSP operations independently from the content data without storing intermediate or final content data; and training stateful parameters of a component behavior model (CBM) with an incoming event stream wherein the CBM is partitioned into stateless behavioral logics and the stateful parameters;

wherein the CBM includes:
- a resource name for a primary key, the resource name designating a respective resource operatively associated with the PSP operations;
- a resource type corresponding to a class associated with the respective resource; and
- a CBM event log database to record an event record of an event that is relevant to the respective resource;
- wherein the stateless behavioral logics are to define intrinsic processes of the respective resource, and wherein the stateful parameters training is to occur automatically by the incoming event stream.

17. The method as defined in claim 16 wherein the CBM further includes input ports, each input port including a type converter to convert or extract input information from input data input to the CBM.

18. The method as defined in claim 16, further comprising:
statistically summarizing event records older than a predetermined threshold of recency;
storing the statistical summaries of the event records; and
discarding the event records.

19. The method as defined in claim 16, further comprising:
reproducing the intermediate or final content data by transforming initial content data with a device functional interface of the CBM and the event-related meta data.

20. The method as defined in claim 16, further comprising:
querying a system event log database;
replaying a PSP operations situation in existence at a predetermined historical time based on the stored event-related meta-data when an interval between the predetermined historical time and a current time is less than a predetermined threshold of recency; and
simulating the PSP operations situation when the interval between the predetermined historical time and the current time is greater than or equal to the predetermined threshold of recency.

* * * * *

UNITED STATES PATENT AND TRADEMARK OFFICE
CERTIFICATE OF CORRECTION

PATENT NO. : 9,047,025 B2
APPLICATION NO. : 13/452813
DATED : June 2, 2015
INVENTOR(S) : Jun Zeng et al.

Page 1 of 1

It is certified that error appears in the above-identified patent and that said Letters Patent is hereby corrected as shown below:

In the claims,

In column 15, line 21, in Claim 3, delete "claim 1," and insert -- claim 1 --, therefor.

Signed and Sealed this
Eighth Day of December, 2015

Michelle K. Lee
*Director of the United States Patent and Trademark Office*